(12) United States Patent
Patterson

(10) Patent No.: US 7,242,167 B2
(45) Date of Patent: Jul. 10, 2007

(54) FAULT TOLERANT ARCHITECTURE FOR PERMANENT MAGNET STARTER GENERATOR SUBSYSTEM

(75) Inventor: Stanley C. Patterson, Fall City, WA (US)

(73) Assignee: Astronics Advanced Electronic Systems Corp., Redmond, WA (US)

( * ) Notice: Subject to any disclaimer, the term of this patent is extended or adjusted under 35 U.S.C. 154(b) by 127 days.

(21) Appl. No.: 11/257,454

(22) Filed: Oct. 24, 2005

(65) Prior Publication Data

US 2006/0033478 A1 Feb. 16, 2006

Related U.S. Application Data

(62) Division of application No. 10/830,934, filed on Apr. 23, 2004, now Pat. No. 7,064,526.

(51) Int. Cl.
*H02K 16/00* (2006.01)

(52) U.S. Cl. .............................. 322/59; 322/45; 322/46; 322/52; 290/31

(58) Field of Classification Search ................ 322/59, 322/52, 45, 46; 290/31
See application file for complete search history.

(56) References Cited

U.S. PATENT DOCUMENTS

| | | | |
|---|---|---|---|
| 5,493,200 A | 2/1996 | Rozman et al. | |
| 5,594,322 A | 1/1997 | Rozman et al. | |
| 5,929,537 A | 7/1999 | Glennon | |
| 6,486,639 B1 * | 11/2002 | Montret et al. | 322/29 |
| 6,844,707 B1 * | 1/2005 | Raad | 322/29 |
| 6,909,263 B2 * | 6/2005 | Xu et al. | 322/29 |
| 6,979,979 B2 * | 12/2005 | Xu et al. | 322/59 |

* cited by examiner

*Primary Examiner*—Darren Schuberg
*Assistant Examiner*—Iraj A. Mohandesi
(74) *Attorney, Agent, or Firm*—Wiggin and Dana LLP; Gregory S. Rosenblatt; Elizabeth A. Galletta

(57) ABSTRACT

A permanent magnet starter/generator subsystem configured in a fault tolerant architecture is described herein for small engine applications. The system allows for lighter system weight, improved system reliability, higher performance capability and reduced maintenance.

1 Claim, 4 Drawing Sheets

FAULT TOLERANT ARCHITECTURE FOR PERMANENT MAGNET STARTER GENERATOR SUBSYSTEM

CROSS REFERENCE TO RELATED APPLICATION(S)

This patent application is a divisional application of U.S. Ser. No. 10/830,934 entitled "Fault Tolerant Architecture For Permanent Magnet Starter Generator Subsystem" filed on Apr. 23, 2004, now U.S. Pat. No. 7,064,526 the entirety of which is incorporated herein by reference.

BACKGROUND OF THE INVENTION

Starter/generator subsystems for small engine applications typically utilize DC brushed motor/generators and an electronic Generator Control Unit (GCU). The DC brushed machine has a number of disadvantages in comparison to a permanent magnet machine of equivalent capacity, including increased size and weight, significantly lower reliability and higher maintenance. The DC brushed machine requires relatively frequent maintenance, including replacement and servicing of brushes and bearings. Typically, maintenance intervals are 600 to 1000 operating hours for brushed machines in small aircraft applications. The brushed starter/generator also typically exhibits significant reductions in generator capability when operating at low speeds, and small aircraft applications often require operation over relatively wide speed ranges (typically 50% to 100% operational range in the generator mode).

Currently, permanent magnet generators (PMGs) are sometimes used as starter/generator subsystems for small engine applications. However, the PMG starter/generator subsystems of the current art have several disadvantages. Since the output voltage and frequency of the PMG varies directly with driveshaft speed, a more complicated regulation and start excitation control method is required, as compared to that of a brushed starter/generator. Also, the PMG output voltage cannot be controlled by means of adjusting stator field excitation (which is a common control technique used with brushed starter/generators), and therefore the PMG output cannot be electronically disabled in the event of a fault. The inability to disable PMG output power during fault mode operation is of particular concern in high reliability applications such as aircraft. A feeder cable short to engine or aircraft structure can result in a hazardous or unsafe condition for typical PMG/Power Conversion Unit (PCU) architectures. A series contractor or circuit breaker is typically required to disable the PMG output voltage. However, the PMG is typically located on or near the engine system and must survive an extremely harsh environment, particularly in aircraft applications. That harsh environment makes it very difficult (and often not technically feasible) to locate a contactor or circuit breaker close to the PMG.

U.S. Pat. No. 5,929,537 describes a starter/generator subsystem utilizing a PMG and bi-directional PCU. However, the starter/generator architecture as described and illustrated in this patent is a non-isolated topology PMG and non-isolated topology PCU. Therefore, very few if any of the "fault tolerant" aspects are achieved. The U.S. Pat. No. 5,929,537 patent also describes an architecture requiring contactors to isolate the PCU, batter, and/or AC loads. The use of high power contactors to isolate these subsystems is necessary for practical non-isolated architectures since a single break-down in the feeder cable to aircraft structure can result in a catastrophic failure condition. The PCU described in the U.S. Pat. No. 5,929,537 patent does not provide several reliability and/or performance features, including power factor corrected generator mode operation; ability to detect ground faults within the PMG, PCU and/or feeder cables; failsafe operation capability including operation in the presence of shorted windings in the PMG, shorted feeder wires, and/or failed PCU converters; or soft start and/or motoring start capability.

U.S. Pat. Nos. 5,594,322 and 5,493,200 describe a generator design with a field winding on the rotor that receives field current for control of the generator output. The PMG described in these patents is entirely different than the PMG design described for this invention. The subsystems described in the U.S. Pat. Nos. 5,594,322 and 5,493,200 patents also do not incorporate the fault tolerant capabilities described for the subsystem described by this invention.

BRIEF SUMMARY OF THE INVENTION

The present invention relates to a starter/generator subsystem for small engine applications that utilizes a permanent magnet generator (PMG) and an electronic Power Conversion Unit (PCU). Further, the permanent magnet generator (PMG) does not require a field winding. The PMG and PCU architecture of this invention incorporates isolated subsystems and fault detection capabilities that lead to a highly reliable and fault tolerant system.

The fault tolerant architecture described herein enables safe operation even in the presence of various fault scenarios, and includes failsafe and fault monitoring features to ensure that appropriate actions can be taken to preclude potentially hazardous conditions. The advantages of the fault tolerant architecture and the associated PMG/PCU subsystem include lighter system weight, improved system reliability and higher performance capability.

The architecture achieves reduced weight for typical Electrical Power Generation and Distribution Systems (EPGDS), for several reasons. The PMG is significantly lighter, smaller and produces less nacelle drag than an equivalent performance brushed starter/generator (S/G). Also, while the PCU is larger and heavier than a GCU for a brushed S/G subsystem, the PCU advantageously incorporates a number of other functions of the EPGDS that are not included in typical GCUs, including ground fault detection, high current contactor functionality, bus current monitoring, fault monitoring and reporting functionality, and intelligent loan sharing operation. Therefore, the total system weight typically favors the PCU based EPGDS. Further, the feeder cable between the PMG and PCU can be much lighter weight than the DC bus feeders (assuming the PMG/PCU architecture is designed appropriately). Additional reductions in EPGDS weight are typically applicable for the architecture since the PCU can be located remote from the engine so that DC bus cables are shorter and less complex.

The architecture also provides improvements in system reliability. The fault tolerant architecture is configured so that three (although other numbers could be used) isolated and independently operable PMG and PCU phases are utilized, which allows generator capability to be retained even in the event of various fault modes. Also, the PMG contains no brushes and hence the associated high failure rate and high incidence of required maintenance is eliminated. Additionally, the PMG can be configured as a bearingless machine, and hence the associated failure rate and high incidence of maintenance is reduced. The system, when configured with a bearingless PMG assembly, is substantially maintenance-free and achieves an estimated Mean Time Before Failure of 20,000 hours or higher. Further, the PMG is designed such that continuous operation into a shorted feeder or stator winding will not result in overheating of the machine or a hazardous condition.

The architecture also improves system reliability in other ways. The PCU is designed so that a failure in one power converter will not propagate to or degrade the generator mode performance of other power converters. Also, the PMG and the PCU are designed so that generator mode operation is achieved even in the event of a failure of up to two phases of the PMG and/or simultaneous failure of up to two phases of the PCU (for a three-phase system; note, however, that reduced output power capacity may be applicable in the event of the described fault mode operation). Additionally, the PMG and the PCU are designed so that each phase is electrically and physically isolated. Therefore, a short-circuit (short) to the engine or aircraft structure within the stator winding, PMG/PCU feeder cable or PCU power converter stage will not result in degraded generator operation. In a three-phase system, up to three simultaneous shorts can be accommodated without generator operational degradation.

The architecture additionally enhances system reliability in other manners. The PCU is designed to continuously monitor for and detect a ground fault condition within any phase of the PMG and/or PCU. The ground fault detection function is fully testable via external command so that a complete end-to-end functionality verification of the ground fault detection circuit can be performed upon command. Also, the PCU can be designed to utilize multiple, parallel solid-state switching devices so that high performance and high reliability operation is achieved, as well as fault tolerant operability within each PCU converter.

The architecture also allows for higher performance capability. The PMG and the PCU are designed so that greater output capability is achieved at low engine speeds. The output power capability of a PMG is directly proportional to drive speed whereas brushed starter/generator machines typically lose output power capability at a much greater rate with reduced drive speed. The subsystem weight penalty for full generator output power capability at engine idle conditions is much greater for brushed starter/generator machines than for PMGs. Also, the PCU static and dynamic regulation capability is superior to present state of the art starter/generator subsystems since the PCU utilizes solid-state components and a high switching frequency converter. Further, the PCU can be designed for parallel operation capability and inherent load sharing without requiring control signal interconnects between PCUs or PMGs.

Additional features of the architecture also provide higher performance capability. The PCU can incorporate smart control, built-in-test, fault reporting and diagnostic trend capabilities, including a data bus interface. Further, a soft start operational capability is easily implemented with the PMG/PCU design and results in significantly less stress to associated engine drive shaft or gear train components as well as reduced battery current demand during start mode operation. The soft start characteristic is fully controllable (and can be custom tailored) by design of the PCU and can control both applied torque and transition times. Also, the PCU is designed so that engine start can be achieved with or without "motoring" of the PMG. That is, the PMG can be at any initial rotational speed (including low speed reverse rotation) prior to start and the PCU can be designed to automatically execute an engine start function. The engine start control algorithm is fully controllable (and can be custom tailored) by design of the PCU.

DETAILED DESCRIPTION

Figure 1:
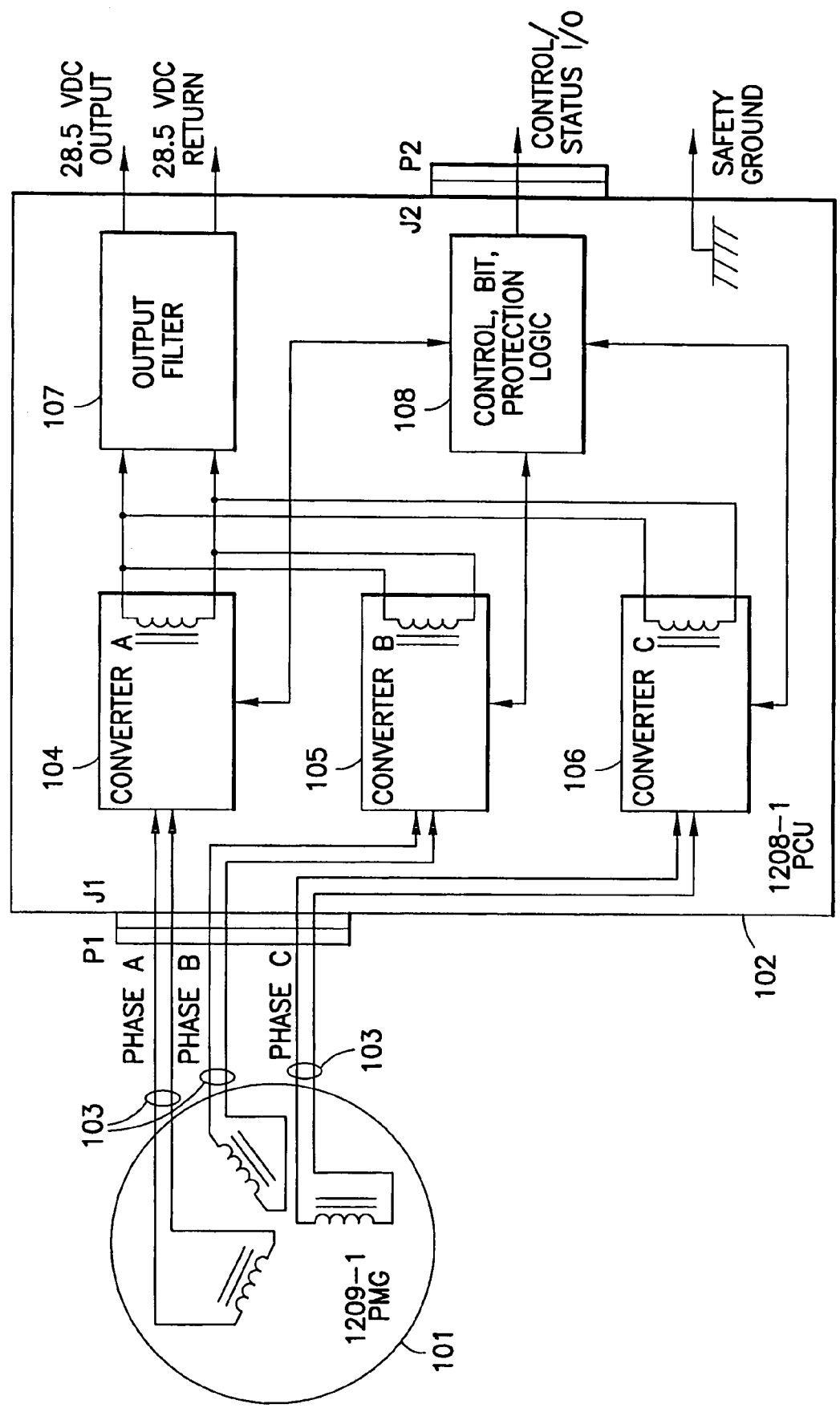
FIG. 1 is a generalized block diagram of a power conversion unit and permanent magnet generator, including a typical electrical interface.

FIG. 1 is a block diagram of a power conversion unit (PCU) and permanent magnet generator (PMG) that illustrates the electrical interface. The PMG 101 is connected to the PCU 102 by a plurality of pairs of wires 103. Each pair of the wires carries a different phase of voltage between the PMG 101 and PCU 102. The voltage is derived in the PMG 101 and converted to the desired output voltage by the PCU 102 when the starter/generator subsystem is operating as a generator. The voltage is derived from a power source connected to the PCU 102 output (labeled "28.5VDC Output" and "28.5VDC Return" in FIG. 1), converted by the PCU 102 to an AC voltage of the desired form, and provided to the PMG 101, when the starter/generator subsystem is operating as a starter. The AC voltage derived in the PCU 102 while operating in the start mode, is specifically regulated in amplitude, frequency and phase angle so as to control the speed, direction of rotation and the torque produced by the PMG 101.

One embodiment of a PMG 101 is a General Dynamics (GD) part number 1209 PMG. The GD part number 1209 PMG 101 is a brushless and bearingless machine. Further, the part number 1209 PMG 101 is designed in accordance with the fault tolerant architecture described herein and is constructed with windings that are electrically isolated from machine structure and from the other windings of the PMG 101.

One embodiment of a PCU 102 is a General Dynamics (GD) part number 1208 PCU and is described below. The GD part number 1208 PCU 102 includes three converter modules 104, 105, 106. Each converter module is connected a single phase of the PMG 101 through a single pair of wires. The converter modules each include a transformer which is connected to an output filter 107. The output filter 107 attenuates high frequency components of the voltage that leaves the PCU 102 and is provided to the aircraft loads. The voltage that leaves the part number 1208 PCU 102 is regulated to 28.5 VDC (but other generator mode output voltages are possible). The part number 1208 PCU 102 also includes a connection for the 28.5VDC output return current that is isolated from the PCU 102 chassis. The converter modules, each operate as a bi-directional converter and each provide an electrically isolated interface to the PMG 101. When the starter/generator subsystem is operated as a generator, the converter modules 104, 105, 106 convert the AC voltage from the PMG 101, to a DC voltage of the desired form. When the starter/generator subsystem is operated as a starter, the converter modules 104, 105, 106 convert a DC voltage, that is derived from a source (typically a battery) connected to the PCU 102 output, to an AC voltage of the desired form. The AC voltage is applied to the PMG 101, to operate the PMG 101 as a motor and cause the engine to rotate and thus begin an engine start operation. The converter modules 104, 105, 106 are connected to the PMG by the plurality of pairs of wires 103. Additionally, the PCU 102 typically includes a control module 108 connected to the converter modules 104, 105, 106 which provides various control and synchronization functions including monitoring of various operating conditions which enable the PCU 102 to achieve the sensorless control of the PMG 101 during engine starts, as well as performing various fault monitoring and built-in-test functions. The control module 108 is typically configured to monitor various internal PCU 102 operating functions and external system operating functions are performing correctly.

Figure 2:
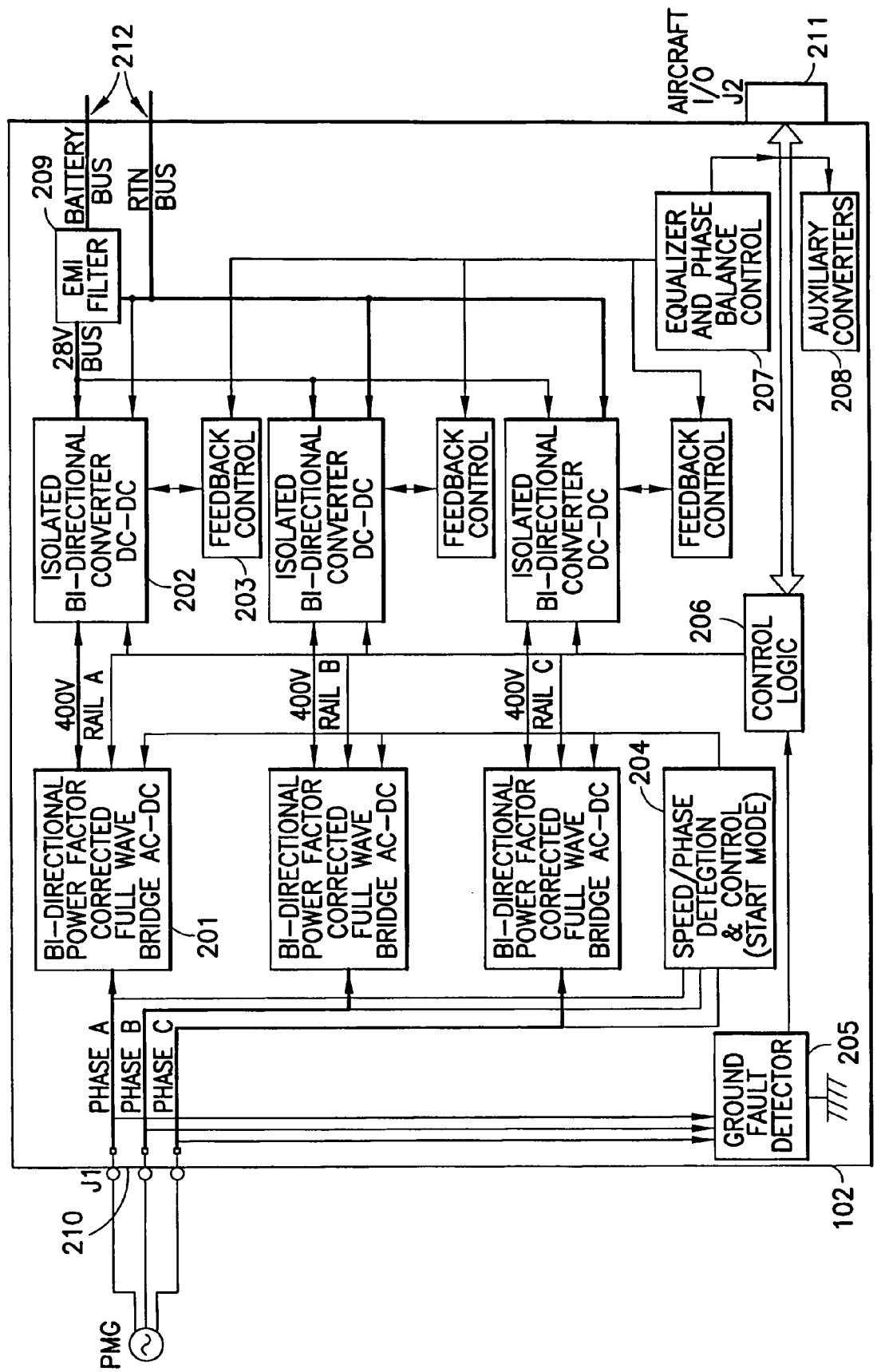
FIG. 2 is a more detailed functional block diagram of a typical power conversion unit.

FIG. 2 is a functional block diagram of a typical power conversion unit 102. This block diagram illustrates a more detailed overview of the functional elements of the PCU 102. The converter modules 104, 105, 106 of FIG. 1 are represented by a combination of three blocks in FIG. 2, the AC/DC bi-directional power factor corrected full wave bridge 201, the DC/DC isolated bi-directional converter 202, and the feedback control 203 blocks. The control module 108 of FIG. 1 is represented by five blocks in FIG. 2, the speed/phase detection and control module 204, the ground fault detector module 205, control logic module 206, the equalizer and phase balance control module 207, and the auxiliary converters module 208. The output filter module 107 of FIG. 1 is represented by the EMI filter module 209 in FIG. 2 and performs essentially the same function. The interface between the PMG 101 and the PCU 102 is represented by the three signals labeled "Phase A," "Phase B" and "Phase C" in FIG. 2. The PMG 101 and PCU 102 interface is a two conductor interface for each phase, as previously described.

In the PCU 102 embodiment illustrated in FIG. 2, the bi-directional power factor corrected full wave bridge AC-DC module 201 performs two functions; in the generator mode, this module converts the variable AC voltage from the PMG 101 to a regulated DC voltage (approximately 400 volts in this example), and in the starter mode, this module inverts a DC voltage to an AC voltage that is provided to the PMG 101 to drive it as a motor. The isolated bi-directional converter DC-DC module 202 of FIG. 2 also performs two functions; in the generator mode, the DC voltage derived by the bridge module 201 is converted to a DC voltage of the desired form through an isolation transformer, and in the starter mode, the voltage that is present on the PCU 102 output bus ("the voltage labeled "28V Bus" in FIG. 2, which is the output voltage filtered by the Filter module 209) is converter to a DC form as desired for proper operation of the Bridge module 201. The DC-DC converter module 202 utilizes a high frequency switching converter with an isolation transformer to ensure that the input/output labeled "400V Rail" and the input/output labeled "28V Bus" of FIG. 2 are always electrically isolated. The Feedback Control module 203 of FIG. 2 ensures that DC-DC converter modules 202 operate at approximately the same power level as the converter modules for the other phases. The Feedback Control module 203 also ensures that each DC-DC converter module 202 is synchronized as desired to enhance PCU 102 performance, improve operating efficiency and reduce electromagnetic interference (EMI). Each Bridge module 201 is connected to one phase of the PMG 101 and to the associated DC-DC converter module 202 for that phase of the PCU 102. Each DC-DC converter module 202 is connected to the associated Bridge module 201 for that phase of the PCU 102, and to the common "28V Bus" (note that a 28VDC output for the PCU 102 is just one embodiment, and that other output forms can also exist). The Feedback Control module 203 is connected to the DC-DC converter module 202 and to the Balance Control module 208.

The Speed/Phase Detection and Control module 204 of FIG. 2 provides the speed and phase detection of the AC voltage from the PMG 101. The speed and phase information is needed to properly implement start mode control in the PCU 102. The Ground Fault Detector module 205 of FIG. 2 monitors the phase voltages of the PMG 101 and the associated circuits in the PCU 102 to detect a fault conduction path from one phase to ground or aircraft structure. A conduction path fault of very low current can be detected by the Ground Fault module 205 and that information is used to ensure that appropriate action can be taken to correct the fault condition. The Control Logic module 206 of FIG. 2 ensures that proper start and generator mode operation is performed by the PCU 102 and that appropriate action is taken in the event a fault is detected. The Equalizer and Phase Balance Control module 207 of FIG. 2 ensures that each DC-DC converter module 202 provides approximately equivalent power during generate and start mode operation, as well as insuring the converters are synchronized as desired. The Auxiliary Converters module 208 of FIG. 2 provides general control power to the various PCU 102 subsystems, and may be comprised of one or more converters. The Speed/Phase Detection module 204 is connected to all three phases of the AC voltages from the PMG 101 and to the associated circuits in the Bridge module 201. The Speed/Phase Detection module 204 is also connected to the control circuits of all three Bridge modules 201. The Ground Fault Detector module 205 is connected to all three phases of the AC voltages from the PMG 101 and to the control circuits of all three Bridge modules 201 and all three DC-DC Converter modules 202. The Control Logic module 206 is connected to Ground Fault Detector module 205, the Equalizer Control module 207, all three phases of the AC voltages from the PMG 101 and to the control circuits of all three Bridge modules 201 and all three DC-DC Converter modules 202. The Auxiliary Converter modules 208 are connected to all circuits within the PCU 102 to provide control power.

The EMI Filter module 209 of FIG. 2 is a low pass filter that reduces ripple frequency and high frequency emissions that are a natural result of the switching function within the DC-DC Converter modules 202. In the embodiment of the PCU illustrated in FIG. 2, two input/output connectors are utilized, J1 210 and J2 211. The J1 connector 210 and associated cable provides the electrical interface between the PMG 101 and the PCU 102. This interconnecting cable is typically shielded to reduce high frequency radiated emissions and mechanically protected to reduce the probability of shorts on these conductors to aircraft structure. The J1 interface 210 is typically not connected to other vehicle systems. The J2 connector and associated cable 211 provides the input/output electrical interface for control signals from other subsystems on the vehicle, such as a flight control computer, to the PCU 102. The J2 interface 211 typically includes control signals that are used to control the various operating modes of the PCU 102, such as Standby, Generate and Start operating modes. The PCU 102 output bus 212 which is illustrated in FIG. 2 as the "Battery Bus" and associated "Return Bus". In the PCU 102 embodiment of FIG. 2, this output is regulated to 28.5VDC by the PCU 102 when operating as a generator, and a 24 VDC battery is typically connected directly to this output bus (hence the title "Battery Bus"). The current return conduction path for the Battery Bus 212 is typically electrically isolated from the PCU 102 chassis and hence a "Return Bus" is typically provided by the PCU 102. The "Return Bus" is typically electrically connected to the vehicle structure in a specific location as part of a single point ground design for the vehicle.

The various bus voltages within the PCU 102 are typically selected to optimize the overall system performance, including weight, reliability, output voltage regulation and starter torque. In the PCU 102 embodiment of FIG. 2, the output Battery Bus 212 voltage is regulated at 28.5VDC, the bus voltage labeled "400V Rail" is regulated to approximately 400 VDC. This voltage is the output voltage of the Bridge module 201 when the PCU 102 is operating in the generator mode, and the output voltage of the DC-DC Converter module 202 when the PCU 102 is operating in the start mode. The PMG 101 is designed so that the voltage produced in the generator mode is compatible with the PCU 102 bus voltages. The power stage for each Bridge module 201 and each DC-DC Converter module 202 is electrically and physically isolated.

The PCU 102 when configured in the fault tolerant architecture of this invention, can provide generate mode power even in the presence of faults on the PMG 101 and/or PCU 102 feeder cables or the faults within the Bridge modules 201 or DC-DC Converter modules 202. Since each phase of the PMG 101 is electrically isolated from the other phases and from the vehicle structure, a feeder cable that has a conductor shorted to the vehicle structure will have no impact upon PMG 101 or PCU 102 operation. In fact, up to three simultaneous conductors or components within the Bridge modules 201 or DC-DC Converter modules 202, can be tolerated without any deleterious impact upon the starter/generator subsystem performance. The PMG 101 is also designed so that a shorted phase winding or a short within a phase pair of feeder cable wires will not cause the PMG 101 to overheat or produce an unsafe operating condition. A short condition within a phase of the PMG 101 or within a phase of the PCU 102 Bridge modules 201 or DC-DC Converter modules 202, will not result in complete loss of the generator mode output power for this fault tolerant architecture. A loss of one phase will result in an approximate 33% reduction in generator mode output power capacity and a loss of two phases will result in an approximate 67% reduction in generator mode output power capacity.

Figure 3:
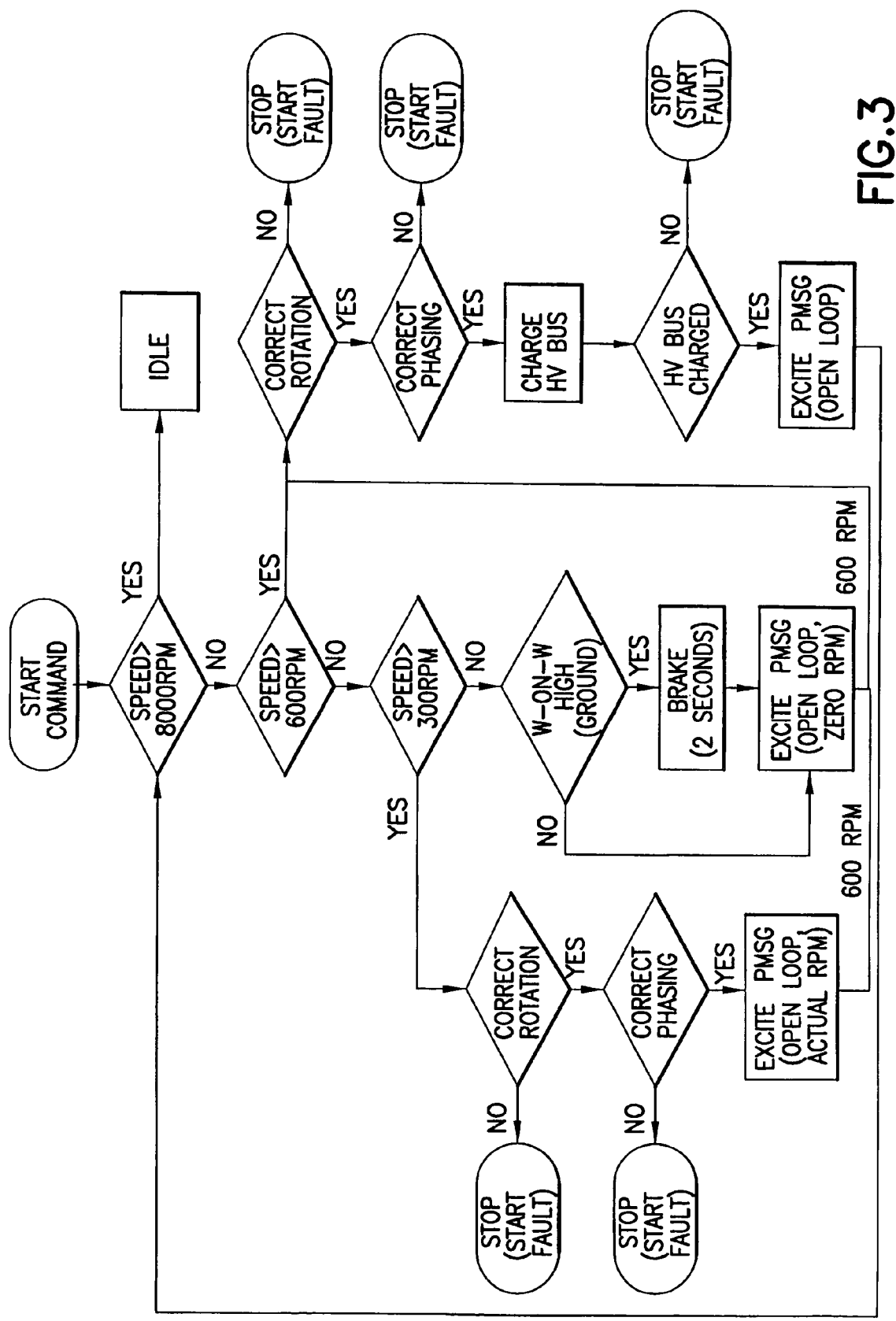
FIG. 3 is a flow diagram of the typical start mode control logic for a permanent magnet starter/generator subsystem designed to operate at full rated speed of approximately 20,000 revolutions per minute.

FIG. 3 is a flow diagram of the start mode control logic utilized for a typical embodiment of the permanent magnet starter/generator subsystem. The PMG 101 in the diagram of FIG. 3 is designed for a maximum drive speed of approximately 20,000 revolutions per minute. The PCU 102 incorporates a sensorless, vector control method for controlling the speed and torque produced by the PMG 101 while operating as a starter, in this embodiment of the permanent magnet starter/generator subsystem. An open loop and closed loop control method are utilized with this embodiment of the PMG 101 start mode control. This method provides for automatic transitions form open to closed loop control in a normal start sequence. The method also allows for the PCU 102 to check for incorrect engine rotation and correct phasing of the PMG 101 output voltage during an engine start. If a fault is encountered during the engine start, the PCU 102 terminates the start sequence and initiates a failed start indication, in this embodiment of the start mode logic implementation. The implementation of Start Mode Control logic is application specific and can be tailored as necessary in the PCU 102. The torque versus speed profile in start mode typically includes a starter assist to approximately 40% maximum PMG drive speed which incorporates a soft start characteristic. The starter assist may vary by 20% of maximum PMG drive speed and can operate in any range from 0%-100% of maximum PMG drive speed.

A "motoring start" is when the rotational speed of the PMG is measured prior to initiating an engine start and the PCU automatically adjusts the AC control excitation to "lock-in" on the initial rotational speed of the PMG and start accelerating from that speed instead of beginning the PMG speed control from a lower speed.

Figure 4:
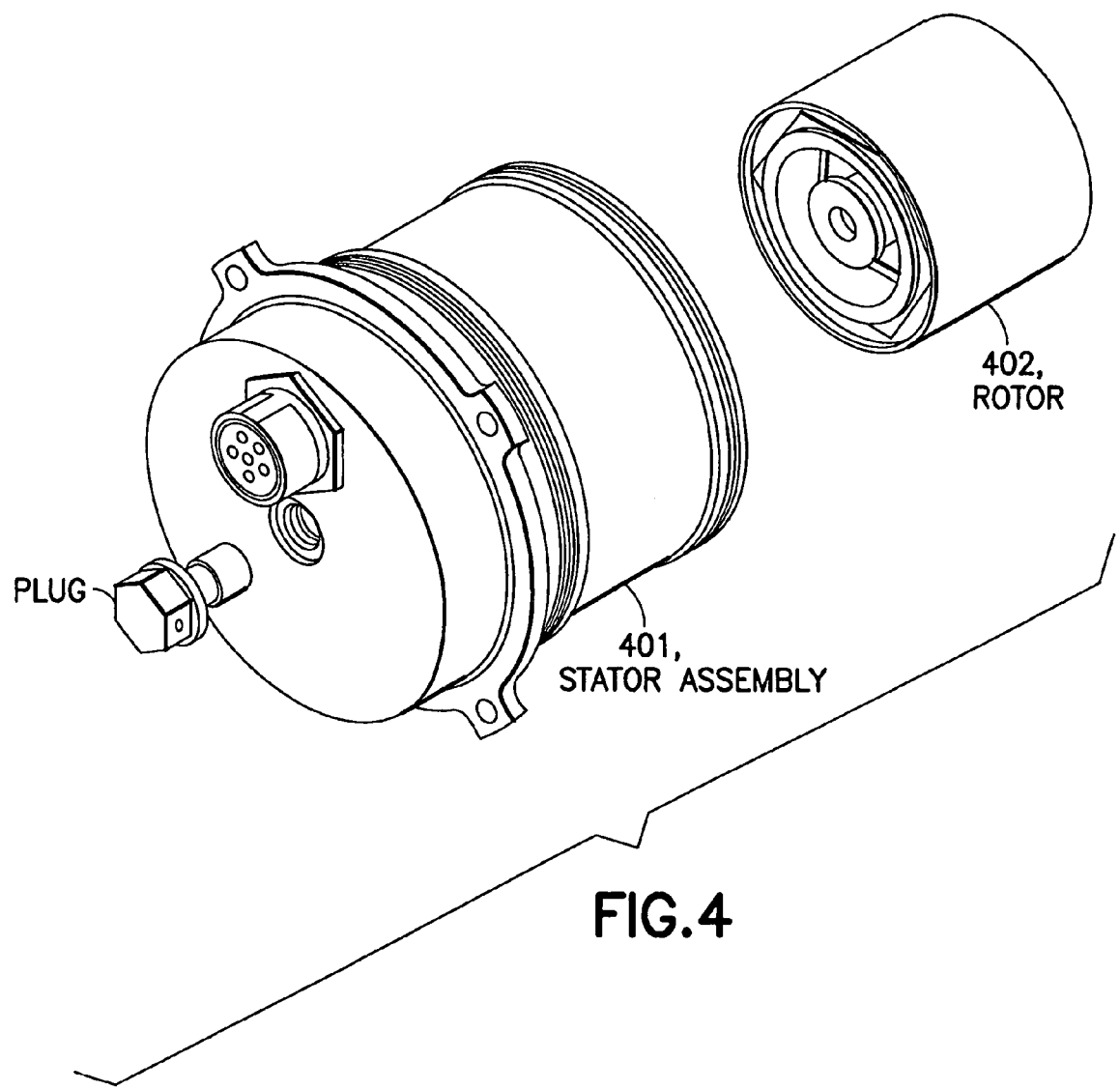
FIG. 4 is an illustration of a typical brushless, bearingless permanent magnet generator.

FIG. 4 is an illustration of a typical permanent magnet generator 101. This embodiment of the PMG 101 is an illustration of the GD part number 1209 PMG 101 and is a brushless, bearingless machine. In this embodiment, the PMG 101 includes two assemblies, a stator assembly 401 and a rotor assembly 402. The stator assembly contains the magnetic core material and the three isolated windings. The rotor assembly contains an array of permanent magnets that are mounted to a bobbin and secured in a suitable fashion to ensure structural integrity at high rotational speeds.

The PMG 101 can also be designed for operation as an integral assembly on an engine shaft (i.e., PMG rotates at same speed as a main or auxiliary engine shaft; no bearings are required) or a shaft mounted, gearbox integrated assembly such as the GD part number 1209 PMG 101 (i.e., PMG rotor is mounted directly to driveshaft on engine accessory gearbox (AGB)). Further, the PMG may be designed for operation as an AGB mounted assembly (i.e., the PMG incorporates a spline and bearings so that the assembly interfaces to engine AGB in similar or identical fashion to conventional brushed S/Gs). Additionally, an optional contactor or circuit breaker can be added in series with the PMG output to remove power from the feeder cables and/or PCU input. The use of this contactor or circuit breaker is optional with the "fault tolerant" architecture.

Other embodiments and uses for the invention also exist. The fault tolerant architecture applications include aircraft and/or automotive applications requiring engine start operation and generation of DC electrical power. The applications also include aircraft and/or automotive applications requiring engine start operation and generation of AC electrical power. Further applications include aircraft and/or automotive applications requiring engine start operation and generation of DC and AC electrical power.

The PCU 102 can be designed for operation as a single assembly located adjacent to or remote from PMG 101. The PCU 102 may also be designed for operation as multiple assemblies located adjacent to or remote from PMG 101. Further the PCU 102 and PMG 101 may be interconnected with a low current feeder cable (i.e., the PMG 101 is designed to produce a voltage that is greater than the average PCU 102 output voltage) or interconnected with a high current feeder cable (i.e., the PMG 101 is designed to produce a voltage that is equal or less than the average PCU 102 output voltage).

What is claimed is:

1. A permanent magnet starter/generator system including:
    a permanent magnet generator (PMG) unit;
    a power conversion unit (PCU) connected to the permanent magnet generator including a plurality of converter modules connected to a power output bus; and
    a filter disposed between and electrically interconnected to the plurality of converter modules and the power output bus; and
    wherein the power output bus is connected to at least one of a vehicle electrical load and a vehicle electrical power distribution system;

the converter modules are connected to a control module;

the power converter modules include a plurality of bi-directional power factor corrected full wave bridge modules, a plurality of isolated bi-directional converter DC-DC modules, and a plurality of feedback control modules;

the isolated DC-DC bi-directional converter modules are each connected to a filter module, one of the plurality of bi-directional power factor corrected full wave bridge modules, and one of the plurality of feedback control modules;

the bi-directional power factor corrected full wave bridge modules are each connected to one phase of a plurality of PMG phases, and one of the plurality of bi-directional power factor corrected full wave bridge modules; and wherein the feedback control modules are each connected to one of the plurality of isolated DC-DC bi-directional converter modules and an equalizer and phase balance control module within the PCU control module.

* * * * *